United States Patent [19]

Hafner BEST AVAILABLE COPY

[11] E Patent Number: Re. 31,737

[45] Reissued Date of Patent: Nov. 20, 1984

[54] ADJUSTABLE DIE AND PUNCH FOR SHEET MATERIAL FASTENING MACHINES

[76] Inventor: Otto P. Hafner, 1321 Paddock Way, Cherry Hill, N.J. 08034

[21] Appl. No.: 718,078

[22] Filed: Aug. 26, 1976

Related U.S. Patent Documents

Reissue of:

[64] Patent No.: 3,862,485
Issued: Jan. 28, 1975
Appl. No.: 384,494
Filed: Aug. 1, 1973

U.S. Applications:

[63] Continuation-in-part of Ser. No. 275,946, Jul. 28, 1972, abandoned.

[51] Int. Cl.[3] ..... B23P 19/00

[52] U.S. Cl. ..... 29/432.2; 29/21.1; 29/509; 29/521; 29/798

[58] Field of Search ..... 29/21.1, 283.5, 432, 29/432.1, 432.2, 509, 521, 798; 72/325, 326, 331

[56] References Cited

U.S. PATENT DOCUMENTS

| | | | |
|---|---|---|---|
| 318,221 | 5/1885 | Thompsen et al. | 72/325 |
| 2,254,558 | 9/1941 | Williams | 29/521 X |
| 2,688,890 | 9/1954 | Williams | 29/521 |
| 2,713,197 | 7/1955 | Schmidt | 29/509 X |
| 2,924,312 | 2/1960 | Williams | 29/432 X |
| 3,599,318 | 8/1971 | Behlen | 29/521 |
| 3,726,000 | 4/1973 | Hafner | 29/21.1 |
| 3,771,216 | 11/1973 | Johnson | 29/509 |

*Primary Examiner*—E. Michael Combs

[57] ABSTRACT

To fasten together two or more overlying sheets of metal or other material having plasticity or deformable properties by partially piercing and deforming sections of the sheets, a fixed pierce-and-forming punch is used in cooperation with a double-acting press having two separately actuatable rams. For displacing sections of the overlying sheets, one of the rams carries a hollow cylindrical pierce-and-forming die the die cavity of which is vertically aligned with, and cooperates with, a fixed pierce-and-forming punch supported in the base. The other of the rams carries a flattening punch which is slidably movable within the central bore of the hollow cylindrical die. The pierce-and-forming die is supported by means which includes fine adjustment means so that the position of the die may be adjusted for different thicknesses of sheets to be fastened, and also for wear on the die and/or punch. The flattening punch is supported by phase adjustment means which permits the angular relationship between the flattening punch and the die to be adjusted for different thicknesses of sheets to be fastened. The latter adjustment is made such that the downwardly-moving flattening punch engages the upper displaced section or sections just after the lower displaced section is uncovered by the upwardly-moving cylindrical die, thereby to spread the lower displaced section while the upper section or sections are still constrained.

14 Claims, 6 Drawing Figures

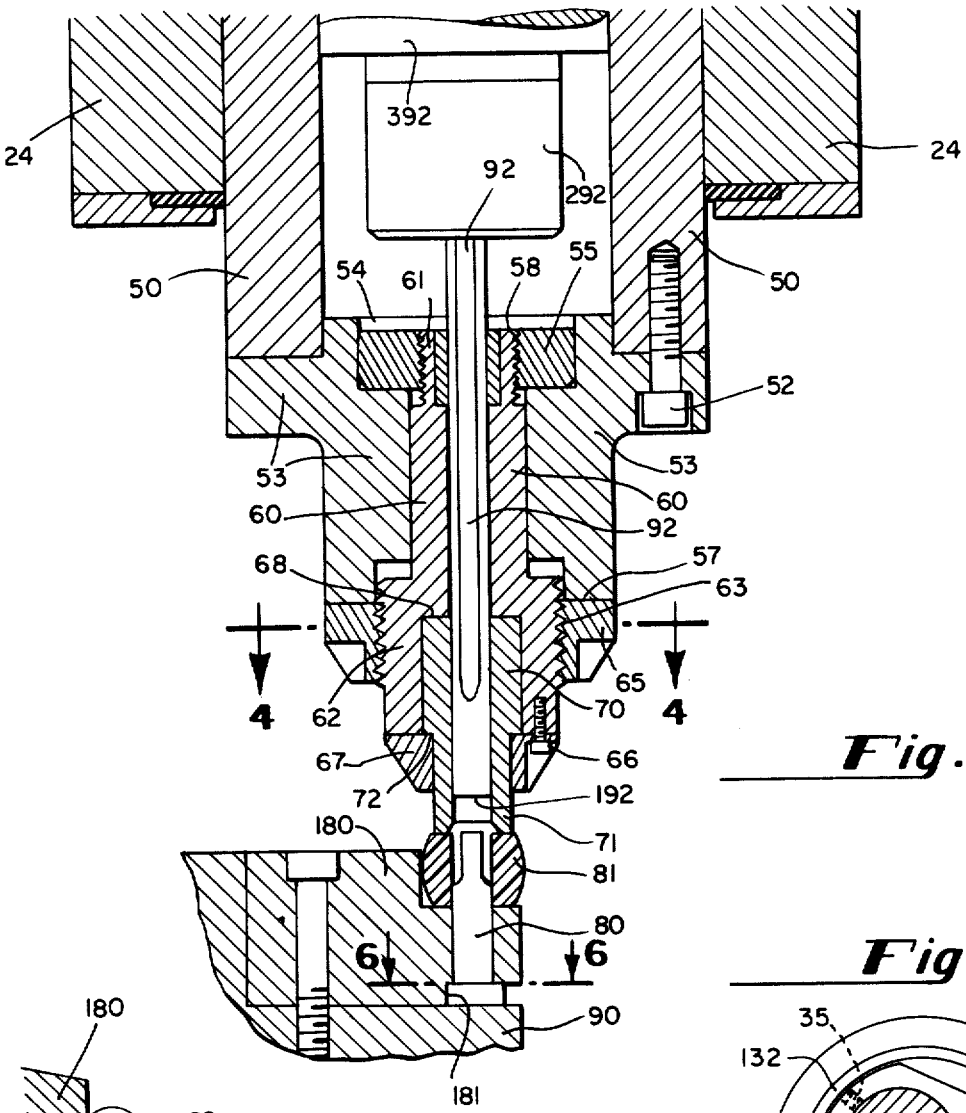
Fig. 3
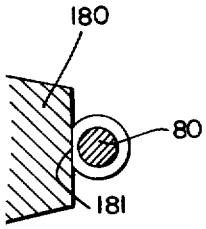
Fig. 6
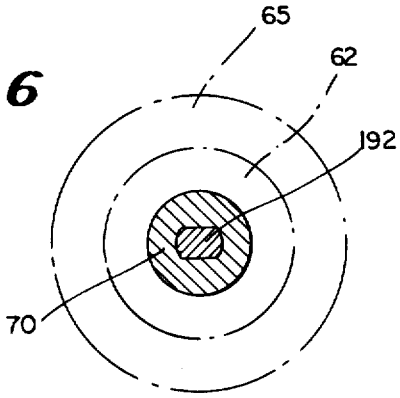
Fig. 4
Fig. 2
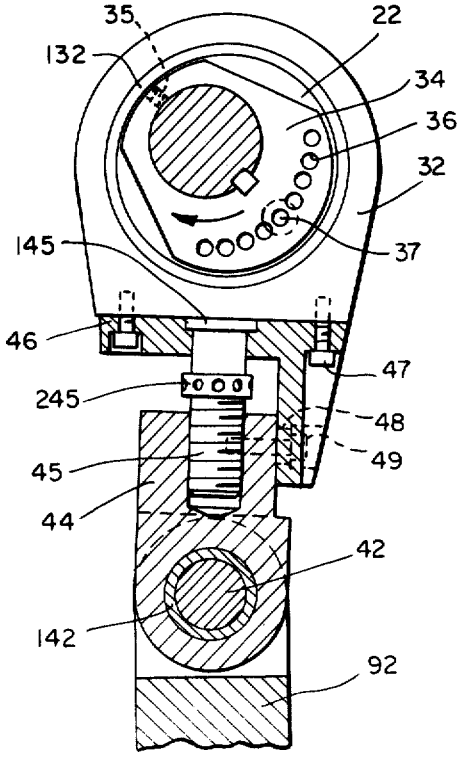

ADJUSTABLE DIE AND PUNCH FOR SHEET MATERIAL FASTENING MACHINES

Matter enclosed in heavy brackets [ ] appears in the original patent but forms no part of this reissue specification; matter printed in italics indicates the additions made by reissue.

CROSS-REFERENCE TO RELATED APPLICATION

[This application is a continuation-in-part application of my earlier-filed pending application, Ser. No. 275,946, filed July 28, 1972, now abandoned in favor of the present application.] *This application is a reissue of U.S. Pat. No. 3,862,485, issued Jan. 28, 1975, and a continuation-in-part of Ser. No. 275,946, filed July 28, 1972, abandoned.*

BACKGROUND OF THE INVENTION

This invention relates to a machine for fastening together overlying sheets of deformable metal or other material having the property of yielding or flowing under load and of sustaining appreciable permanent deformation without rupture. In some instances there may be an intervening layer or film of another material between the sheets to be fastened.

SUMMARY OF THE INVENTION

An object of the present invention is to provide, for a double acting press of the type disclosed in my U.S. Pat. No. 3,726,000, granted Apr. 10, 1973, adjustable support means for the cutting-and-forming die and also the flattening punch so that adjustment may be made for different thickness of sheets to be fastened, as well as to adjust for wear of the die and/or punch.

A more specific object is to provide adjustment means so that the upper sheet or sheets of the displaced section (displaced by the die and fixed punch) is not engaged by the downwardly-moving flattening punch until the lowermost sheet of the displaced section is uncovered by the upwardly-moving die so as to allow the lower sheet of the displaced section to be spread while the upper sheet or sheets are still confined by the die.

BRIEF DESCRIPTION OF THE DRAWINGS

FIG. 2 is a fragmentary view, largely in section, looking along the lines 2—2 of FIG. 1.

FIG. 3 is an enlarged fragmentary view, in section, of the lower portion of the structure shown in FIG. 1.

FIG. 4 is a view looking down along the line 4—4 of FIG. 3.

FIG. 6 is a view, in section, looking downwardly along the line 6—6 of FIG. 3.

DETAILED DESCRIPTION OF THE PREFERRED EMBODIMENTS

Figure 1:
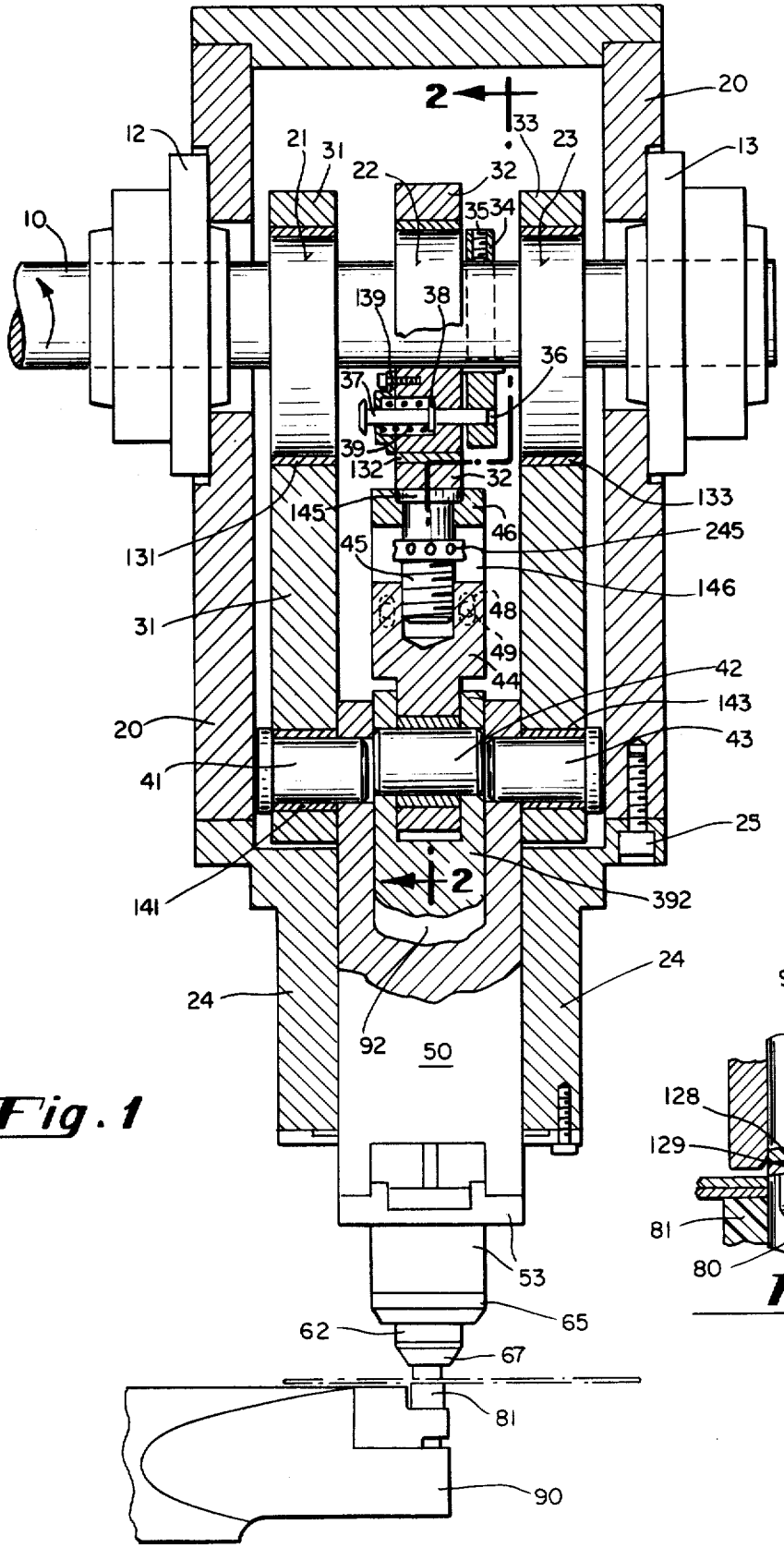
FIG. 1 is an elevational view, largely in section, of the head portion of a fastening machine incorporating the present invention.

Referring now to FIG. 1, a crank shaft 10, which is driven rotationally by means not shown, has at its forward end a pair of spaced-apart shear blocks 12 and 13 which are supported by a crank housing 20.

Supported on crank shaft 10, within the housing 20, are three eccentric discs 21, 22 and 23. The two outside discs 21 and 23 are keyed to the crank shaft. The holes of the two outside eccentric discs 21 and 23 are identically positioned and hence these two outside eccentrics move in timed coincidence with each other. The center eccentric 22 is supported free on shaft 10 and, by means to be described, is maintained in out-of-phase relation with the two outside eccentrics. This phase relationship is adjustable by a phase selector drive plate 34. In typical case, for particular metal thickness, the center eccentric may, for example, have a delay angle of the order of 37°.

As clearly seen in FIGS. 1 and 2, the angular position of the center eccentric disc 22 is determined and controlled by the phase selector drive plate 34 which is fixed to crank shaft 10, as by set screw 35 and key in keyway. Plate 34 is provided with a series of holes 36 for receiving selectively a pin 37 which extends through a hole in eccentric disc 22 and is spring-loaded by a spring 39 which thrusts against a flange 38 on the pin. It will be seen that by withdrawing pin 39 from the plate 34, moving the disc 22 angularly, and then reinserting the drive pin 39 in a different hole 36, the angular position, and hence the phase relationship, of the center eccentric disc 22 may be adjustable relative to the two outside discs 21 and 23. Spring 39 is retained by retainer 139.

The three eccentric discs 21, 22 and 23 carry, respectively, cranks 31, 32 and 33, suitably supported on bushings 131, 132, 133. In FIG. 1, the outside eccentric discs 21 and 23 are illustrated in such position that the outside cranks 31 and 33 are at the bottom of their downward stroke. At this same instant, the center eccentric disc 22 is in the position shown in FIG. 2. As seen in FIG. 2, the center crank 32 has started its downward descent, but will not reach its downward limit for another 37°.

The two outside cranks 31 and 33 each carries at its lower end a stub-shaft, 41 and 43, respective, suitably journalled in bushing 141 and 143. The inward ends of the stub shafts 41 and 43 project into opposing holes in the walls of a hollow rectangular ram or slide 50 which is slidable up and down within, and is guided by, the hollow rectangular lower guide portion 24 of the housing 20. Guide portion 24 is secured to the upper portion of the housing, as by bolts and dowels 25.

Referring now to FIG. 3, bolted as by bolts and dowels 52 to the lower end of the rectangular slide or ram 50, and carried thereby, is a hollow neck poriton 53 the upper neck of which adapts to the rectangular opening between rams 50 and the lower portion of which is round having a central bore into which a cylindrical screw and die holder 60 is inserted.

The upper end portion of neck portion 53 has a recess 54 into which is inserted a nut 55 which is non-rotatable in the neck 53. The non-rotatable nut 55 is provided with fine threads 58 which receive the fine threaded upper end portion 61 of the die holder 60. The lower end 62 of die holder 60 has an enlarged diameter and is externally threaded at 63 with threads which are much larger than the fine threads of the upper end portion 61. An internaly threaded clamping ring 65 is screwed onto the external threads 63 and tightened against the end surface 57 of the neck 53.

The enlarged-diameter lower end portion of the die holder 60 has a recess which receives the upper end portion of a hollow cylindrical cutting-and-forming die 70. The lower end portion 71 of the cutting-and-forming die 70 is of reduced diameter forming, at the junction with the upper end portion, a shoulder 72. A lock cap 67 is fitted over the reduced-diameter portion 71 of die 70 and abuts against the shoulder 72 of the due 70. Cap 67 is secured, as by bolts 66, to the end surface of the die holder 60.

The cylindrical cutting-and-forming die 70 has cutting edges and recessed portions which function as the forming portions. The die 70 may correspond to that disclosed and illustrated in FIG. 9 of my aforesaid U.S. Pat. No. 3,726,000.

Positioned below the cutting-and-forming die 70 in the base 90 of the press is a pierce-and-forming punch 80. The pierce-and-forming punch 80 has cutting edges for piercing, and recessed portions for forming. The punch 80 may correspond to the punch described in my U.S. Pat. No. 3,726,000, and may be axially adjustable as there shown. Surrounding the pierce-and-forming punch 80 is a stripper or spring member 81 which may preferably be formed of urethane material.

Positioned within the aligned bores of the die holder 60 and die 70 is the enlongated shank of a flattening punch 92. As seen in FIGS. 1–3, flattening punch 92 is supported by a punch holder 292 fastened to a center ram or slide 392 which is carried by pin 42 and adjustable member 44. Adjustable member 44 is supported adjustably by a bolt 45 which in turn is supported by a plate 46 secured, as by screws 47 (FIG. 2) to the underside of center crank 32. Plate 46 has a depending portion 146 having therein a pair of slots 48 which receive screws 49. In this way, the member 44 is supported against rotation. Bolt 45 has an enlarged portion head 145 which is supported in a recess in plate 46. Bolt 45 also has an integral enlarged round portion 245 with holes for pin which may be engaged, as by a pin wrench, to turn bolt 45 to raise or lower member 44, thereby to adjust the position of the head 192 of flattening punch 92 relative to the pierce-and-forming punch 80. To make this adjustment, it is, of course, necessary to loosen the screws 49.

To adjust the position of the cutting-and-forming die 70 relative to the fixed pierce-and-forming punch 80, the operator manually unscrews clamping ring 65 and then manually grasps and moves die holder 60 in one rotational direction or the other. Since nut 55 is non-rotatable in the recess 54 in neck 53, when the die holder 60 is manually rotated, it turns on threads 58 and is therefore moved adjustably upwardly or downwardly in neck 53, according to the direction in which holder 60 is rotated. When holder 60 is so adjusted upwardly or downwardly, the cutting-and-forming die 70 is moved adjustably in corresponding manner since it is carried by the holder 60. And, since threads 58 are fine threads, fine and accurate adjustments may be made of the position of the cutting-and-forming die 70.

After the fine adjustment just described has been made, clamping ring 65 is replaced and tightened. The threads 63 of clamping ring 65 and of the lower enlarged portion 62 of the die holder 60 are large and heavy in comparison with the fine threads at the upper end of the die holder 60. Thus, when the cutting-and-forming die 70 is lowered by its slide ram 50 to pierce and form the overlying metal sheets, the reactive load or thrust is upward through the heavy threads 63. The thrust path may be traced from the cutting-and-forming die 70 through shoulder 68 of die holder 60, holder 60, the large heavy threads 63, the clamping ring 65, the abutting end surface 57 of neck portion 53, the rectangular slide ram 50, stub shafts 41 and 43 and their associated bushings 141 and 143, and cranks 31 and 33 and their associated bushings 131 and 133. It is to be noted that this upward thrust or load during the cutting and forming operation is not placed on the fine threads 58 which are employed for adjusting of the cutting and forming die 70.

As already indicated, adjusting of flattening punch 92, relative to the fixed pierce-and-forming punch 80, is made by loosening scrrews 49 (to allow them to move up or down in the slots 48) and then rotating the threaded bolt 45 in the member 44. This is done by inserting a pin in a hole of enlarged portion 245 and rotating the part.

At a section 4—4 of FIG. 3, the flattening punch 92 may have a shape such as is shown in FIG. 4. To maintain proper orientation between the flattening punch 92 and the annular terminal end of the cylindrical cutting-and-forming die 70, the outer surface of the shank of the flattening punch 92 and the inner wall of the hollow cylindrical cutting-and-forming die 70 may each be provided with flats (flat surfaces). These flats are clearly seen in FIG. 4, which is a view taken along the line 4—4 of FIG. 3. The flattening punch 92 is maintained in its proper oriented position by punch holder 292 which is secured to the center ram 392.

The fixed pierce-and-forming punch 80 in the base 90 of the machine is supported in a punch holder 180 which has a flat 181. The flat on the punch 80 is oriented to correspond with the flat 181 on the punch holder 180.

Figure 5:
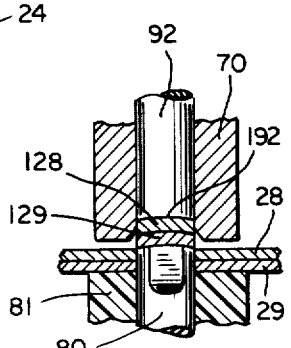
FIG. 5 is an enlarged illustration showing that the lower sheet of the displaced section is uncovered by the die at the instant the downwardly-moving flattening punch engages the upper sheet, thereby to spread the lower sheet of the displaced section.

FIG. 5 illustrates two overlying sheets 28 and 29 at a time instant in the operating cycle of the fastening machine just after the sections 128 and 129 have been displaced by the downwardly-moving cylindrical cutting-and-forming die 70 in cooperation with the fixed pierce-and-forming punch 80. In FIG. 5, the cylindrical cutting-and-forming die 70 is now rising and flattening punch 92 is moving downwardly. The end face 192 of the downwardly-moving flattening punch 92 has just engaged the upper surface of the upper displaced section 128. At this instant, the upwardly-moving cylindrical die 70 has just cleared the lower displaced section 129. The upper displaced section 128 is still encased. This represents a desirable timing relationship. It allows the flattening punch 92 to transmit its energy through the still-encased upper displaced section 128 to the lower displaced section 129 to spread the lower section 129 over the upper sheet 28.

One means for achieving the desirable timing relationship just described between the cylindrical cutting-and-forming die 70 and the flattening punch 92 is illustrated in FIGS. 1 and 2, and has already been briefly described hereinbefore. It will be seen that the phase relationship between the flattening punch 92 and the cylindrical die 70 is adjustable by means of the phase selector drive plate 34. To adjust the phase relationship, the drive pin 37 is pulled out of the hole 36 in which it has been positioned, the freely-mounted disc 22 is rotated adjustably on the shaft 10, and the drive pin 37 is reinserted in a different hole 36 of the series of holes provided in the phase selector drive plate 34. The phase adjustment allows the desirable timing relationship described above, and illustrated in FIG. 5, to be maintained for different thicknesses of sheets.

As has already been indicated, the relationship between the pierce-and-forming punch 80 in the base of the machine and the flattening punch 92 may be adjusted for different thickness is of sheets, and/or for wear, either by adjusting the flattening punch 92 as described in the present application or by adjusting the base punch 80 as described in my earlier-filed application. In either case, adjustment of the phase relationship between the flattening punch 92 and the cylindrical die 70, as by means such as have been described herein, is desirable in order to achieve the advantageous timing relationship illustrated in FIG. 5 and described above.

What is claimed is:

1. Punch and die apparatus for fastening overlying planar sheets of metal or other deformable material, said apparatus comprising:

a. a press having longitudinally movable first and second rams supported on a rigid base;

b. a longitudinally extending pierce-and-forming punch rigidly mounted on said base, said punch having a free end face;

c. a cutting-and-forming die rigidly mounted on said first ram for movement therewith, said die having a longitudinally extending punch-receiving aperture into which said pierce-and-forming punch is receivable when said first ram is extended;

d. a flattening punch rigidly mounted on said second ram for movement therewith, said flattening punch being longitudinally slidably received in said punch-receiving aperture;

e. said flattening punch having an end face cooperable with said end face of said pierce-and-forming punch when said second ram is extended;

f. means for adjusting the spacing between the end faces of said flattening punch and pierce-and-forming punch when said second ram is extended; and g. means for adjusting the phase relation between the times of extensions of said first and second rams.

2. Apparatus according to claim 1 characterized in that said means for adjusting said phase relation comprises means for adjusting the timing of said second ram.

3. Apparatus according to claim 2 characterized in that:

a. said first and second rams are driven by a common shaft through first and second eccentrics;

b. said means for adjusting said phase relation comprises means for adjusting the angular position of the second eccentric on said common shaft.

4. Apparatus according to claim 2 characterized in that said means for adjusting the spacing between the end face of said punches comprises means for adjusting the position of said end face of said flattening punch.

5. Apparatus according to claim 3 characterized in that said means for adjusting the spacing between the end face of said punches comprises means for adjusting the position of said end face of said flattening punch.

6. Apparatus according to claim 1 characterized in that:

a. said cutting-and-forming die includes a die holder and a hollow die carried by said die holder;

b. said die holder has a first set of fine external threads and a second set of heavy external threads;

c. first threaded means engage with said set of fine threads for supporting said die holder in said first ram against gravitational forces;

d. second threaded means engage with said set of heavy threads for taking the upward thrust imposed on said die during the fastening operation and directing said thrust to said first ram along a path which bypasses and protects said fine threads from said thrust forces;

e. said second threaded means are adapted to permit rotational movement of said holder in said first threaded means to allow for fine adjustment of the free end of said die.

7. Apparatus according to claim 6 characterized in that said first ram includes a lower neck portion which receives said die holder.

8. Apparatus according to claim 7 characterized in that said second threaded means includes an internally-threaded clamping ring which when rotated into a locking position abuts against the neck portion of said first ram.

9. Apparatus according to claim 6 characterized in that:

a. said flattening punch has an elongated shank in the aligned center bores of said die holder and die;

b. drive means are provided which include first and second eccentric cranks for said first and second rams;

c. said second eccentric crank for said second ram is out of phase in the delayed direction with said first crank which drives said first ram;

d. the phase relationship between said first crank and said second crank is such that when said flattening punch reaches the downward limit of its stroke said die has been raised above its downward limit to an extent sufficient to uncover only the lower most of the overlying displaced sections of metal sheets.

10. Punch and die apparatus for fastening overlying planar sheets of metal or other deformable material, said apparatus comprising:

a. a press having reciprocatingly movable first and second rams;

b. a pierce-and-forming punch and a cutting-and-forming die opposingly positioned, one of which is mounted on said first ram for movement therewith;

c. said die having a longitudinally extending aperture into which the free end face of said pierce-and-forming punch is received when said first ram is extended;

d. a flattening punch mounted on said second ram for movement therewith, said flattening punch being slidably received in said punch-receiving aperture of said die;

e. said flattening punch having an end face which becomes cooperable with the end face of said piercing-and-forming punch when said second ram is extended to an extent sufficient to bring the end free of said flattening punch beyond the end of said die aperture and outside said die;

f. means for adjusting the spacing between the end faces of said flattening punch and pierce-and-forming punch when said second ram is extended; and g. means for adjusting the phase relation between the times of extensions of said first and second rams.

11. Apparatus according to claim 10 wherein said die is mounted on said first ram for movement therewith.

12. Apparatus for locking together overlying sheets of deformable material, said apparatus comprising:

a. means for piercing first and second overlying sheets discontinuously along a boundary line defining an area for displacing the material of said first and second sheets within said area out of the planes of the non-displaced first and second sheet material until the exterior surface of the displaced first sheet material is just beyond the plane of the exterior surface of the non-displaced second sheet material; and b. means for compressing together the displaced material of said first and second sheets while confining the displaced material of the second sheet to limit its outward spread and to spread outwardly the displaced first sheet material over the outer surface of the non-displaced second sheet material beyond the edges of the piercings therein.

*13. Spot clinch tool for forming a spot clinch joint by lancing and swaging two or more materials together using one complete stroke of a power source in a single station, said power source having a power stroke and a retract stroke, said tool utilizing an anvil, die and punch*

*means for moving one of said punch and anvil while maintaining the other stationary during said complete stroke of said power source,*

*means for moving one of said punch and anvil toward the other during a first part of said power stroke,*

*means for piercing said materials with said punch and die to lance them during a second part of said power stroke,*

*means for holding the die in a first position spaced from the anvil during both said first and second parts of said power stroke,*

*means for moving the die to a second position in respect to said anvil during a third part of said power stroke,*

*means for swaging the lanced portions of said materials with said punch and anvil during a fourth and final part of said power stroke,*

*means for maintaining the die and the anvil in said second position during said fourth and final part of said power stroke and during a first part of said retract stroke, and*

*means for moving said die relative to said anvil from said second position to said first position during a second and final part of said retract stroke.*

*14. Spot clinch method for forming a spot clinch joint by lancing and swaging two or more materials together using one complete stroke of a power source in a single station, said power source having a power stroke and a retract stroke, said method utilizing an anvil, die and punch, said method comprising*

*moving one of said punch and anvil while maintaining the other stationary during said complete stroke of said power source,*

*moving said one of said punch and anvil toward the other during a first part of said power stroke,*

*lancing said materials by piercing them with said punch and die during a second part of said power stroke,*

*holding the die in a first position spaced from the anvil during both said first and second parts of said power stroke,*

*moving the die to a second position in respect to said anvil during a third part of said power stroke,*

*swaging the lanced portion of said materials during a fourth and final part of said power stroke,*

*maintaining the die and the anvil in said second position during said fourth and final part of said power stroke and during a first part of said retract stroke,*

*and moving said die relative to said anvil from said second position to said first position during a second and final part of said retract stroke.*

* * * * *